United States Patent
Ivie

(10) Patent No.: US 11,840,006 B1
(45) Date of Patent: Dec. 12, 2023

(54) DEVICE AND METHOD FOR USING MATERIAL HAVING LOW VISCOSITY IN AN EXTRUSION BLOW MOLDING APPARATUS

(71) Applicant: Graham Engineering Company, LLC, York, PA (US)

(72) Inventor: Kristopher J. Ivie, York, PA (US)

(73) Assignee: Graham Engineering Company, LLC, York, PA (US)

( * ) Notice: Subject to any disclaimer, the term of this patent is extended or adjusted under 35 U.S.C. 154(b) by 0 days.

(21) Appl. No.: 18/145,240

(22) Filed: Dec. 22, 2022

(51) Int. Cl.
  *B29C 49/04* (2006.01)
  *B29C 49/78* (2006.01)
  *B29C 49/42* (2006.01)
  *B29C 49/00* (2006.01)
  *B29K 105/00* (2006.01)

(52) U.S. Cl.
  CPC ........ *B29C 49/041* (2013.01); *B29C 49/0006* (2022.05); *B29C 49/42403* (2022.05); *B29C 49/783* (2013.01); *B29C 49/786* (2013.01); *B29K 2105/0094* (2013.01)

(58) Field of Classification Search
  CPC ............ B29C 49/041; B29C 49/42403; B29C 49/0006; B29C 49/783; B29C 49/786
  See application file for complete search history.

(56) References Cited

U.S. PATENT DOCUMENTS

2012/0080812 A1* 4/2012 Himes ................. B29C 48/272
    425/226

FOREIGN PATENT DOCUMENTS

EP     1354692 A1 * 10/2003 ............. B29C 49/04

OTHER PUBLICATIONS

Mechanical translation of Koetke et al EP1354692 A1 dated Oct. 2003. (Year: 2003).*

\* cited by examiner

*Primary Examiner* — Robert B Davis
(74) *Attorney, Agent, or Firm* — Potomac Law Group, PLLC

(57) ABSTRACT

A flow head and a method for use with a blow molding apparatus. The flow head includes a flow head housing with a material flow cavity. The flow head housing includes a movable die pin mechanism which is moveable between an open position and a closed position. A main melt pipe is connected to the material flow cavity. The main melt pipe is maintained at a first temperature. A shot chamber mechanism is connected to the material flow cavity. The shot chamber mechanism is maintained at a second temperature, which is lower than the first temperature. Thermoplastic material is formed into a parison for the blow molding apparatus. As the movable die pin mechanism is positioned in the closed position, the thermoplastic material is moved to the shot chamber to prevent degradation of the thermoplastic material.

20 Claims, 6 Drawing Sheets

DEVICE AND METHOD FOR USING MATERIAL HAVING LOW VISCOSITY IN AN EXTRUSION BLOW MOLDING APPARATUS

FIELD OF THE INVENTION

The present invention generally relates to the field of blow molding. In particular, the invention related to a device and method which allows material having low viscosity, such as extrusion grade polyethylene terephthalate, to be used in the blow molding apparatus.

BACKGROUND OF THE INVENTION

Polymer resins, such as polyethylene terephthalate (PET), are widely used in the packaging industry. PET is a linear, thermoplastic polyester resin. The advantages of PET include toughness, clarity, good barrier properties, light weight, design flexibility, chemical resistance, and good shelf-life performance. Furthermore, PET is environmentally friendly because it can often be recycled. These characteristics of PET make it a popular material in the manufacturing of containers, for example, beverage bottles.

There are a variety of production methodologies to produce PET containers. For example, injection stretch blow molding may be used to make PET bottles. Of the various methodologies, one piece PET containers having an integrated handle are commonly formed using extrusion blow molding. The extrusion blow molding process includes extruding a polymer resin in a softened state through an annular die to form a molten hollow tube or parison. The molten parison is placed in a hollow blow mold having a cavity corresponding to the desired shape of the container being formed. Air is injected to inflate the parison against the interior walls of the blow mold. Upon contact with the walls, the parison cools rapidly and assumes the shape of the mold.

To form beverage bottles, "bottle-grade" PET is typically used. Bottle-grade PET has a melt viscosity that is low enough to enable a fast injection stretch blow molding step with minimal resistance to flow. Bottle-grade PET generally cannot be used in the production of larger handle-ware containers using extrusion blow molding, however, because of low melt strength. Melt strength refers to the ability of the polymer to retain its shape against forces such as gravity. A high melt strength tube of polymer could be stretched and snap back to close to its original shape while a low melt strength material may permanently deform under its own weight due to gravity. Low melt strength hinders the ability to form a suitable parison. If a parison in the molten state has insufficient melt strength, the parison may be stretched into a non-uniform geometry and thickness, or when extruded horizontally or upwards, it or may completely collapse as the parison is drawn down by its own weight, thereby resulting in the inability to produce a container. As melt strength increases, material distribution in the walls of the resultant container improves, and the process becomes more controllable and repeatable.

To make PET suitable for extrusion blow molding, PET manufacturers have developed special grades of PET sometimes called extrusion PET or "EPET." Typically, EPET is high molecular weight PET which generally requires higher processing temperatures. The higher processing temperatures can lead to certain processing challenges.

Given the higher temperatures at which EPET is melted and maintained during article manufacture, the molten EPET can degrade if production is halted for extended periods of time, which in turn will affect the quality of the containers produced from the degraded EPET. Degraded EPET is hotter, less viscous, tackier, and less predictable than other resins, particularly when used in upward extruding blow molding systems. Accordingly, degraded molten EPET must be avoided when restarting the molding run. During machine stops the material under pressure becomes less viscous and will continue to flow out of the die for an extended period of time which can flow over and cover equipment if not properly handled.

It would, therefore, be beneficial to have a device, system and method for properly removing, storing and utilizing the molten EPET from the flow head when the extrusion blow molding is paused or stopped, thereby eliminating the need to handle uncontained or degraded molten EPET during the extrusion blow molding process. It would also be beneficial to use the stored molten EPET to facilitate the restart of the extrusion blow molding process.

SUMMARY OF THE INVENTION

An embodiment is directed to a flow head for use with a blow molding apparatus. The flow head includes a flow head housing with a material flow cavity. The flow head housing includes a movable die mechanism (by movement of a pin or bushing) which is moveable between an open position and a closed position. The illustrative embodiment shows a moveable pin for controlling open and close position of the die. A main melt pipe is connected to the material flow cavity. The main melt pipe is maintained at a first temperature. A shot chamber mechanism is connected to the material flow cavity. The shot chamber mechanism is maintained at a second temperature, which is lower than the first temperature. Thermoplastic material is formed into a parison for the blow molding apparatus. As the movable die pin mechanism is positioned in the closed position, the thermoplastic material is moved to the shot chamber to prevent leakage or degradation of the thermoplastic material.

An embodiment is directed to a method for controlling the flow of molten thermoplastic material to a blow molding machine. The method includes: feeding a molten thermoplastic material through a main melt pipe into a flow head operably connected to a chamber; stopping the feeding of the molten thermoplastic material through a main melt pipe into the flow head for a period of time, resulting in a volume of the molten thermoplastic material remaining in the flow head; and moving the volume of the molten thermoplastic material from the flow head into the chamber, wherein the volume of the molten thermoplastic material in the chamber is maintained at a temperature which is equal or preferably less than the temperature of the molten thermoplastic material in the main melt pipe.

An embodiment is directed to a method for controlling the flow of molten thermoplastic material to a blow molding machine. The method includes: feeding a first molten thermoplastic material through a main melt pipe into a flow head operably connected to a chamber; stopping the feed of the first molten thermoplastic material through a main melt pipe into the flow head for a period of time, resulting in a volume of the first molten thermoplastic material remaining in the flow head; moving the volume of the first molten thermoplastic material from the flow head into the chamber; discarding the volume of the first molten thermoplastic material from the chamber; moving a second molten thermoplastic material into the chamber and heating the second molten thermoplastic material; and restarting the feed of the first molten thermoplastic material and moving the second molten thermoplastic material from the chamber to the flow head.

Other features and advantages of the present invention will be apparent from the following more detailed description of the illustrative embodiment, taken in conjunction with the accompanying drawings which illustrate, by way of example, the principles of the invention.

DETAILED DESCRIPTION OF THE INVENTION

Figure 1:
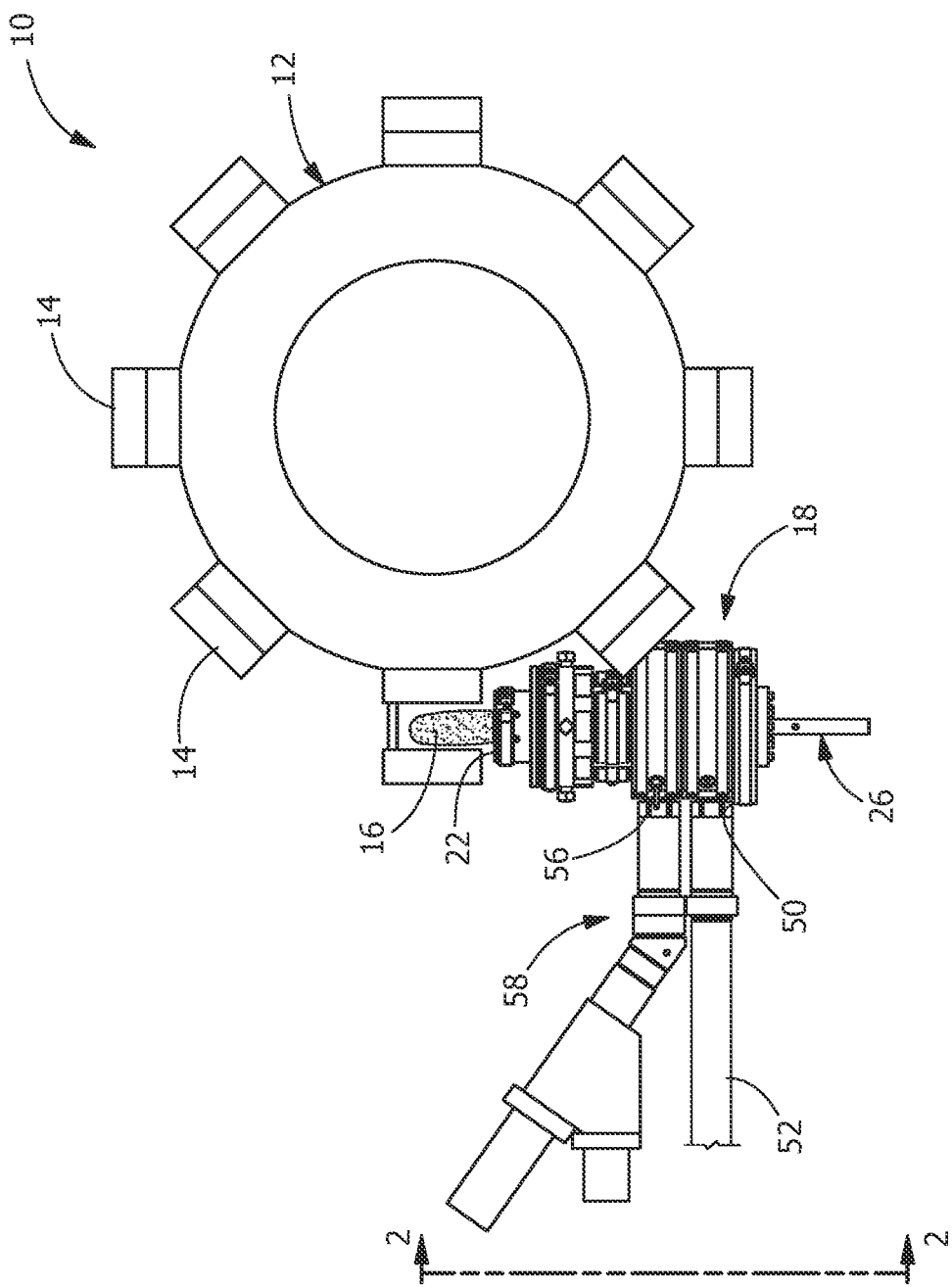
FIG. 1 is a diagrammatic illustration of a blow mold apparatus indicating the location of a die with a main melt pipe and a shot chamber mechanism according to an illustrative embodiment of the present invention.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

Moreover, the features and benefits of the invention are illustrated by reference to the preferred embodiments. Accordingly, the invention expressly should not be limited to such embodiments illustrating some possible non-limiting combination of features that may exist alone or in other combinations of features, the scope of the invention being defined by the claims appended hereto.

The invention is directed to a system, device and method for controlling a molten thermoplastic material which is used in a blow molding apparatus. The systems may be used with any blow molding apparatus, including both downward and upward extruding blow molding apparatus. Thermoplastic materials include but are not limited to high density polyethylene (HDPE), low density polyethylene (LDPE), polypropylene (PP), polyvinyl chloride (PVC), polyethylene terephthalate (PET), cyclic olefins (COC), and polystyrene (PS). A preferred thermoplastic material is extrusion polyethylene terephthalate (EPET).

As shown in FIG. 1 a blow molding apparatus 10 includes a wheel 12 with molds 14 which are provided about the circumference of the wheel 12. The molds 14 are configured to capture parison 16 which flows from a flow head or die 18. The parison 16 is extruded thermoplastic material, as described above. In the illustrative embodiment shown, the flow head or die 18 is an upward extruding flow head and the blow molding apparatus 10 is an upward extruding rotary blow molding apparatus.

As shown in FIGS. 2 through 6, the flow head or die 18 has a housing 20 with a parison extruding surface 22 which is positioned proximate the outer circumference of the wheel 12 of the blow molding apparatus 10. A molten thermoplastic material flow cavity 24 extends from the parison extruding surface 22 into the housing 20. In the illustrative embodiment shown the molten thermoplastic material flow cavity 24 is provided proximate the longitudinal axis of the housing 20. However, other configurations of the housing 20 may be used.

A movable die pin mechanism 26 is provided in the molten thermoplastic material flow cavity 24. A parison forming head 28 is provided on the die pin mechanism proximate the parison extruding surface 22. A die pin stem 30 extends from the parison forming head 28 through a center column 32 of the housing 20 and through a bottom surface 34 of the housing 20. A side surface 36 of the parison forming head 28 has an arcuate configuration to properly form the parison as the parison is extruded from the flow head or die 18. The side surface 36 has a plug portion 38 which is provided on the portion of the parison forming head 28 with the largest diameter.

Actuators (not shown) may be provided to open and close movable die pin mechanism 26. Any suitable actuators, including a hydraulic actuator, as is known in the industry. A servo actuator is one example of a suitable actuator.

The material flow cavity 24 has a material forming portion 40 and a material receiving portion 42. The material forming portion 40 is provided proximate the parison extruding surface 22 and is dimensioned to receive the parison forming head 28 therein. The material receiving portion 42 is provided between the material forming portion 40 and the bottom surface 34 of the housing 20. The material receiving portion 42 extends circumferentially about an inner surface 44 of the center column 32 of the housing 20 and an inner surface 46 of a side wall 48 of the housing 20.

A main melt pipe receiving opening 50 extends through the side wall 48 and into the material receiving portion 42. A main melt pipe 52 extends outward from the main melt pipe receiving opening 50. The main melt pipe 52 may be fabricated from any suitable material, preferably a metal or ceramic capable of withstanding the temperatures of molten thermoplastic material 54. When in operation, the molten thermoplastic material 54 flows through the main melt pipe 52 and into the material receiving portion 42 of the material flow cavity 24. Heating elements 55 are provided proximate to or in the main melt pipe 52 to maintain the appropriate temperature and viscosity of the molten thermoplastic material 54 as it flows through the main melt pipe 52. The heating elements 56 may be any known heating devices or methods which fit into the designated space allotted.

An extruder, such as, but not limited to, a screw extruder (not shown) or other known mechanisms may be used to deliver and move the molten thermoplastic material 54 through the main melt pipe 52 and the flow head or die 18. The extruder directs molten thermoplastic material 54 into the main melt pipe 52 which is connected to and in communication with the material flow cavity 24 of the flow head or die 18.

A shot chamber mechanism receiving opening 56 extends through the side wall 48 and into the material receiving portion 42. In the illustrative embodiment shown, the shot chamber mechanism receiving opening 56 is positioned between the main melt pipe receiving opening 50 and the parison extruding surface 22. However, other configurations and positioning of the shot chamber mechanism receiving opening 56 and the main melt pipe receiving opening 50 may be used.

A shot chamber mechanism 58 extends outward from the shot chamber mechanism receiving opening 56. The shot chamber mechanism 58 may be fabricated from any suitable material, preferably a metal or ceramic capable of withstanding the temperatures of the molten thermoplastic material 54.

The shot chamber mechanism 58 includes a shot chamber 60, a plunger 62, an actuator (servo-mechanical or hydraulic piston/cylinder) 64, a check valve 66 and heating elements 68. The shot chamber 60 extends from and is provided proximate the shot chamber mechanism receiving opening 56. The shot chamber 60 is dimensioned to receive molten thermoplastic material 54 therein, as will be more fully described. Heating elements 68 are provided proximate to or in the shot chamber 60 to maintain the appropriate temperature and viscosity of the molten thermoplastic material 54 as it is stored and moved through the shot chamber 60.

Figure 2:
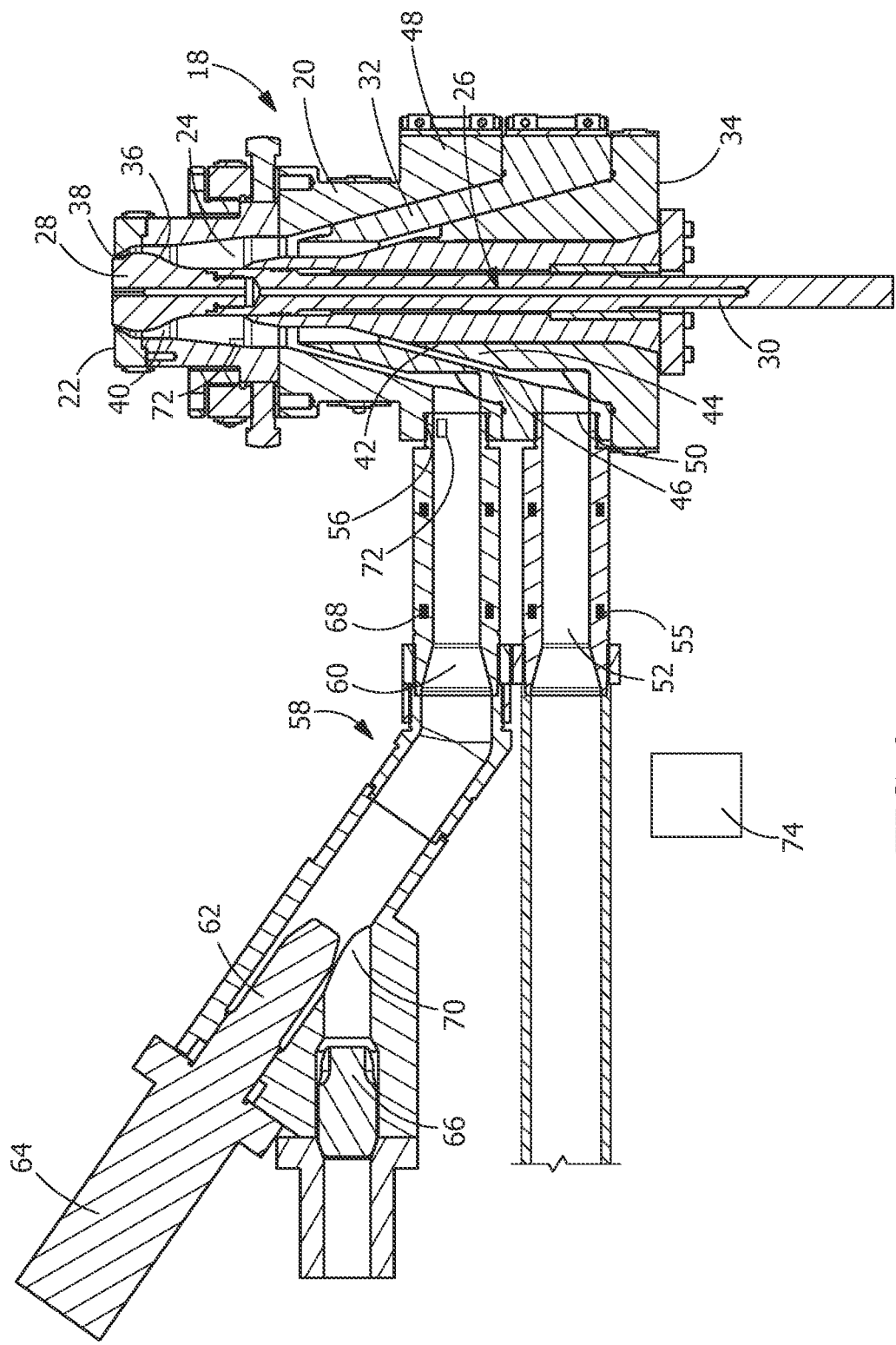
FIG. 2 is a cross-sectional view of the die, the main melt pipe and the shot chamber mechanism, the die, the main melt pipe and the shot chamber mechanism are shown with no molten thermoplastic material therein.
Figure 3:
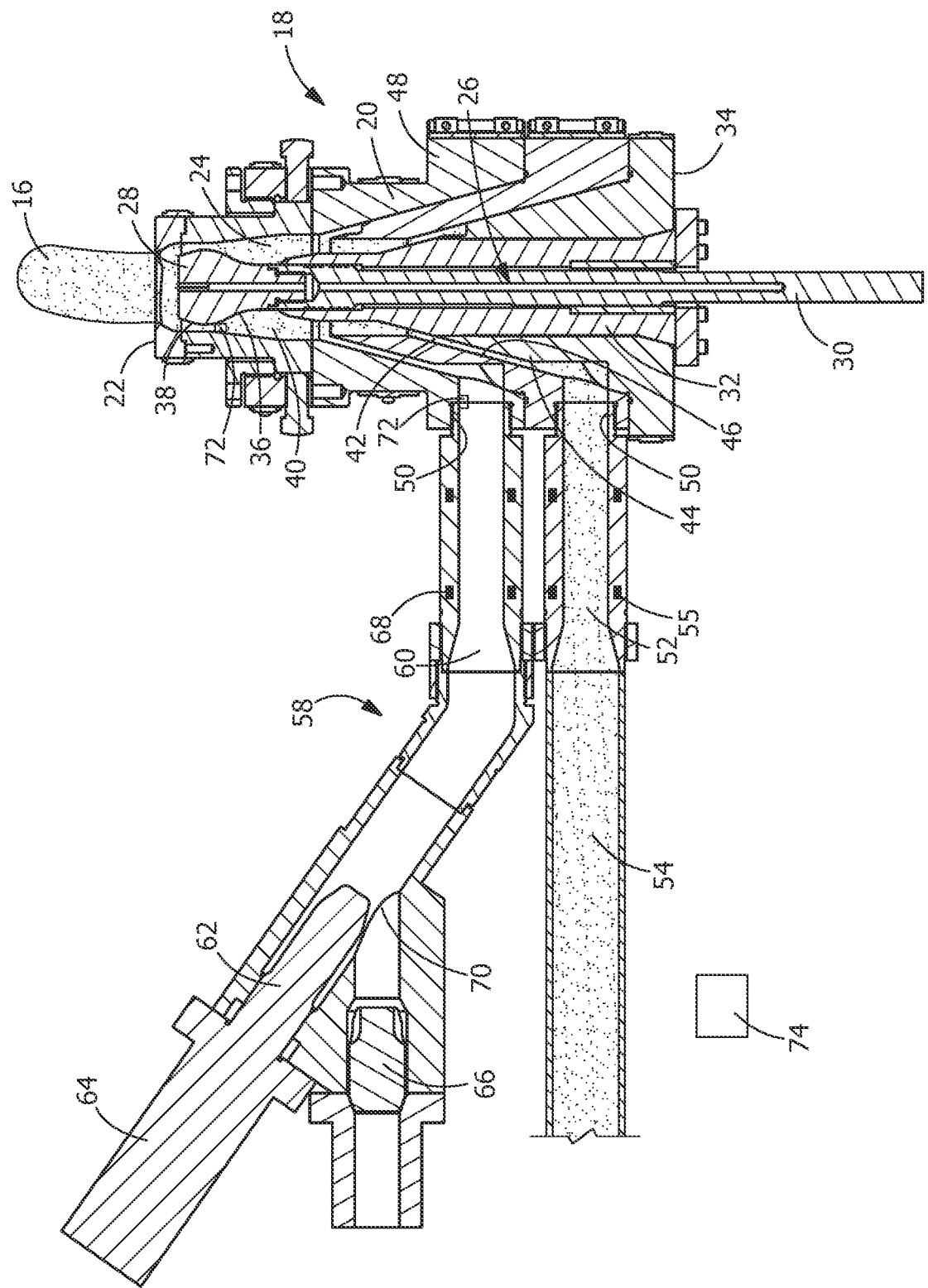
FIG. 3 is a cross-sectional view similar to that of FIG. 2 with the die pin in an open position and the molten thermoplastic material flowing through the main melt pipe and the die to form a hollow parison which flows from the die.
Figure 5:
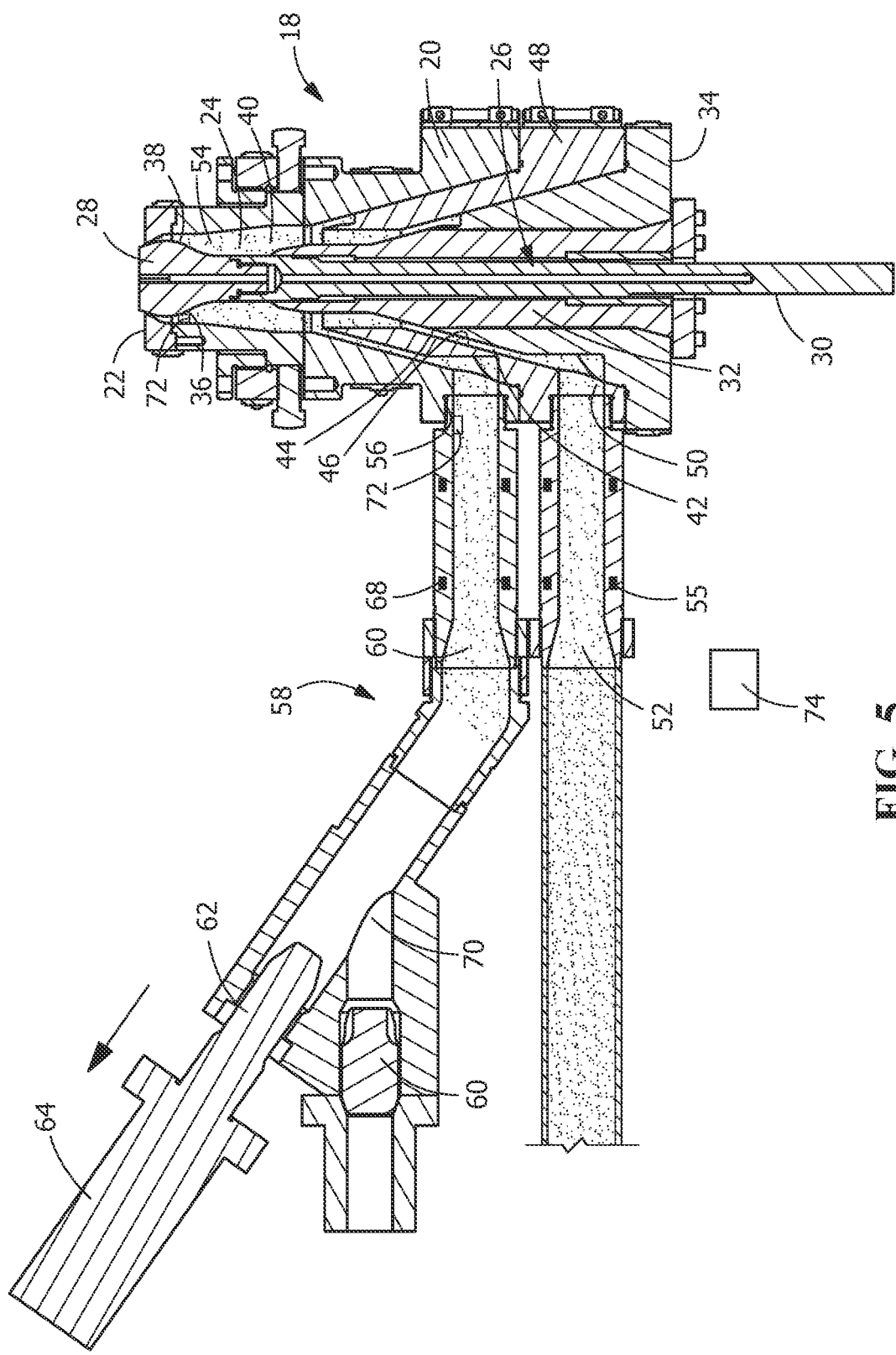
FIG. 5 is a cross-sectional view similar to that of FIG. 4 with the die pin in a closed position, preventing the hollow parison from being released from the die, and the plunger in the shot chamber mechanism more fully retracted from the shot chamber to cause additional molten thermoplastic material to flow from the die into the shot chamber mechanism.

The plunger 62 is provided an end of the shot chamber mechanism 58 which is spaced from the housing 20 of the flow head or die 18. In the illustrative embodiment shown, the plunger 62 is connected to the actuator 64, wherein movement of the actuator 64 causes the plunger 62 to move in the shot chamber 60. However, other types of devices or actuators, such as, but not limited to, hydraulic servo actuators, may be used to provide the type of linear movement required for the plunger 62. The plunger 62 is movable between a closed position, as shown in FIGS. 2 and 3, and an open position, as shown in FIG. 5.

The movement of the plunger 62 controls the amount and speed of flow of the thermoplastic material 54 into and out of the shot chamber 60. In addition, controlled movement of the plunger 62 prevents air voids from occurring in the thermoplastic material 54 in the shot chamber 60. The use of a pressure sensor 72 can be used to regulate the movement of the plunger 62 in order to both prevent leakage through the die 18 and prevent voids inside the shot chamber 60.

In the illustrative embodiment shown, the shot chamber 60 has a branch 70 which divides off of the shot chamber 60. The check valve 66 is provided in the branch 70. In the embodiment shown, the branch 70 extends from the shot chamber 60 at approximately a 45 degree angle. However, other configurations may be used. This branch 70 allows connection to an extruder to add material and prime the shot chamber 60 during first introduction of material or changing of materials. It also allows for the addition of dissimilar materials to be extruded when desired.

The heating elements 68 of the shot chamber 60 are provided between the shot chamber mechanism receiving opening 56 and the branch 70. The heating elements 68 may be any known heating devices or methods which fit into the designated space allotted.

One or more pressure sensors 72 may be provided in the shot chamber 60 or in the material flow cavity 24. The pressure sensors 72 are positioned to monitor the pressure in the material flow cavity 24 of the flow head or die 18. The pressure sensors 72 can be transducers or any other type of mechanism which is capable of sensing the pressure in the material flow cavity 24 of the flow head or die 18.

A controller 74 is provided in communication with at least the piston 64, the pressure sensor 72, the main melt pipe 52 and the movable die pin mechanism 26. The controller 74 receives input from one or more of the pressure sensor 72, the main melt pipe 52, the movable die pin mechanism 26 and/or other components to control the piston 64 and the plunger 62 of the shot chamber mechanism 58.

The controller 74 may be a processor, a programmable logic controller, or other electronic controller. Communication between the controller 74 and the various components of the system, may be through wires, may be wireless, or a combination of wired and wireless systems. The controller coordinates the opening and closing of the movable die pin mechanism 26 and the plunger 62 in order to control flow of the thermoplastic material 54 through the flow head or out from the flow head or die 18 and/or into the shot chamber mechanism 58.

In use, the molten thermoplastic material 54 flows through the main melt pipe 52 and into the material flow cavity 24 of the flow head or die 18. With the movable die pin mechanism 26 and the parison forming head 28 in the open position, as shown in FIG. 3, the molten thermoplastic material 54 flows past the parison forming head 28 to form the hollow parison 16, as shown in FIG. 1, which is captured by the molds 14 (FIG. 1). The parison 16 continuously flows upward from the parison extruding surface 22 of the flow head or die 18 and into the mold halves 14, where the parison 16 is blown into a desired shape.

Figure 4:
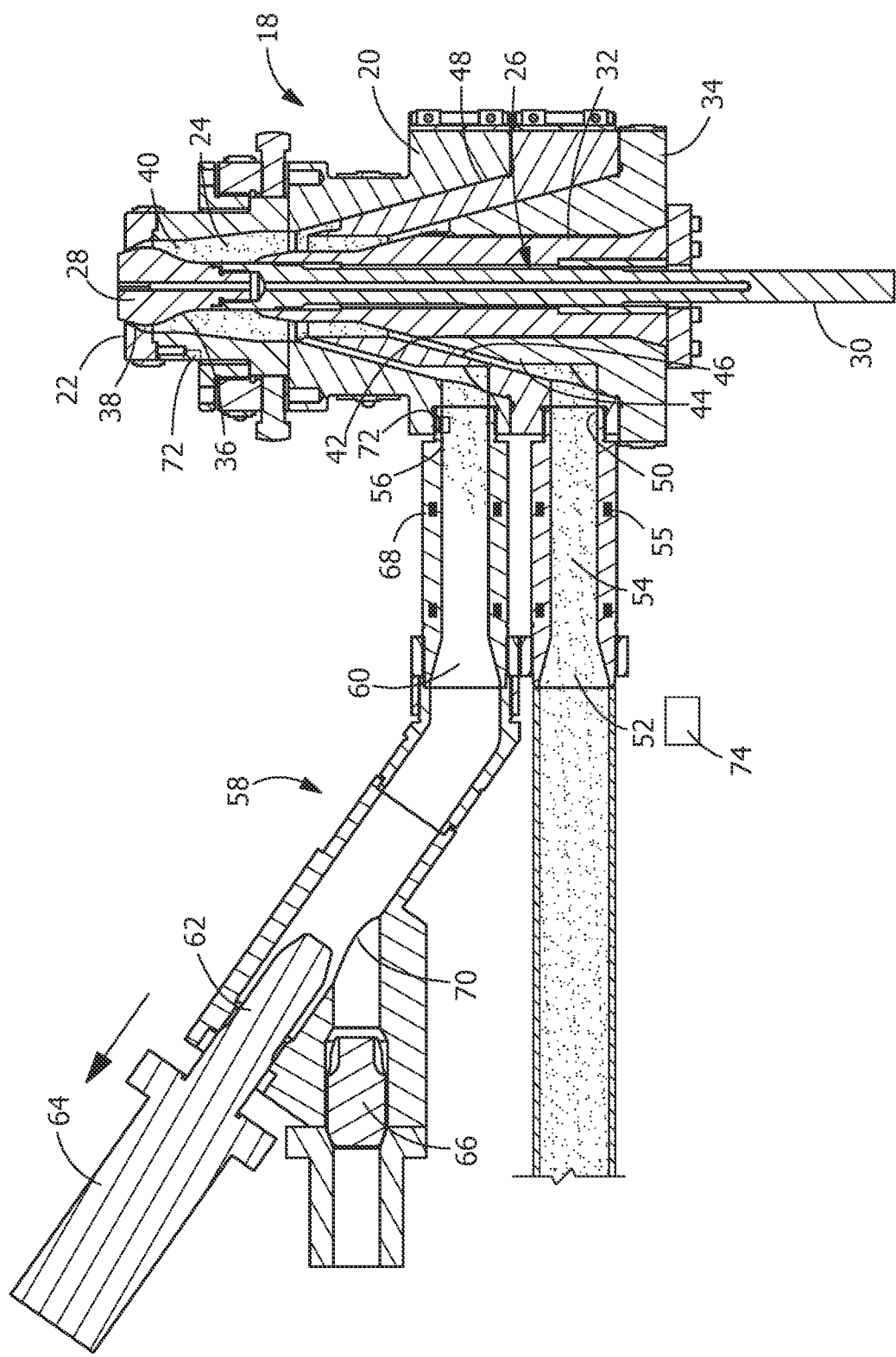
FIG. 4 is a cross-sectional view similar to that of FIG. 3 with the die pin in a closed position, preventing the hollow parison from being released from the die, a plunger in the shot chamber mechanism is partially retracted from the shot chamber to cause the molten thermoplastic material to flow from the die into the shot chamber mechanism.

When production is stopped for a period of time, the movable die pin mechanism 26 is moved to the closed position, as shown in FIG. 4. In this position the plug portion 38 of the parison forming head is moved into engagement with side walls of the material flow cavity 24 at the parison extruding surface 22. The engagement of the plug portion 38 with the side walls of the material flow cavity 24 prevents the thermoplastic material 54 from exiting the flow head or die 18 at parison extruding surface 22. As the molten thermoplastic material 54 continues to flow from the main melt pipe 52 into the material flow cavity 24 of the flow head or die 18, pressure in the material flow cavity 24 of the flow head or die 18 increases with the increase in volume of the molten thermoplastic material 54. The flow of from the main melt pipe 52 into the material flow cavity 24 of the flow head or die 18 continues for a period of time even after the extruder is shut down.

The retention and accumulation of the thermoplastic material 54 in the material flow cavity 24 of the flow head or die 18 can cause unwanted leakage as well as degradation of the thermoplastic material 54, as the temperature of the material flow cavity 24 of the flow head or die 18 may remain heated at the required temperature to retain the desired characteristics of the thermoplastic material 54 needed to properly supply the parison 16 to the molds 14.

In order to relieve the pressure in the flow head or die 18 and prevent the leaking and degradation of the thermoplastic material 54 in the material flow cavity 24 of the flow head or die 18, the shot chamber mechanism 56 is activated to allow the thermoplastic material 54 in the material flow cavity 24 of the flow head or die 18 to flow into the shot chamber 60 of the shot chamber mechanism 56.

As the shot chamber mechanism 56 is activated, the actuator 64 engages the plunger 62 causing the plunger 62 to move away from or retract from the flow head or die 18, as indicated by arrow A shown in FIG. 4. As the plunger 62 is retracted, empty space (which if sealed by polymer may in effect create a vacuum) is created in the shot chamber 60, causing the thermoplastic material 54 in the material flow cavity 24 to flow into the shot chamber 60.

The movement of the plunger 62 is controlled by the controller 74. The controller 74 receives information from one or more of the pressure sensors 72, the screw extruder, the moveable pin die mechanism 26 or other components of the system. Upon receipt of the relevant information, the controller 74 determines if the plunger 62 is to be moved and the speed at which the plunger 62 is to be moved. The controller 74 then communicates with the piston 74 to move the plunger 62 appropriately.

The speed at which the plunger 62 is moved allows the thermoplastic material 54 in the material flow cavity 24 to be purged or withdrawn from the material flow cavity 24 at the correct speed to prevent degradation of the thermoplastic material 54. The controlled speed of the plunger 62 is also prevents air voids from forming in the thermoplastic material 54 which is moved to the shot chamber 60.

After the initial purge of the material flow cavity 24 is complete, molten thermoplastic material 54 may continue to enter the material flow cavity 24 after the movable die pin mechanism 26 is moved to the closed position and the screw extruder is stopped. Consequently, the controller continues to monitor the inputs to determine if the plunger 62 must be continued to be retracted or whether the plunger 62 movement may be stopped.

The molten thermoplastic material 54 in the shot chamber 62 is maintained as a constant temperature by the heating elements 68 positioned in or proximate to the shot chamber 60. The molten thermoplastic material 54 in the shot chamber 62 is maintained at a temperature which is lower than the temperature of the molten thermoplastic material 54 in the main melt pipe 52. The lower temperature helps prevent degradation of material. For example, the temperature of the molten thermoplastic material 54 in the shot chamber 62 may be between approximately 40 degree to approximately 70 degrees lower than the temperature of the molten thermoplastic material 54 in the main melt pipe 52.

Figure 6:
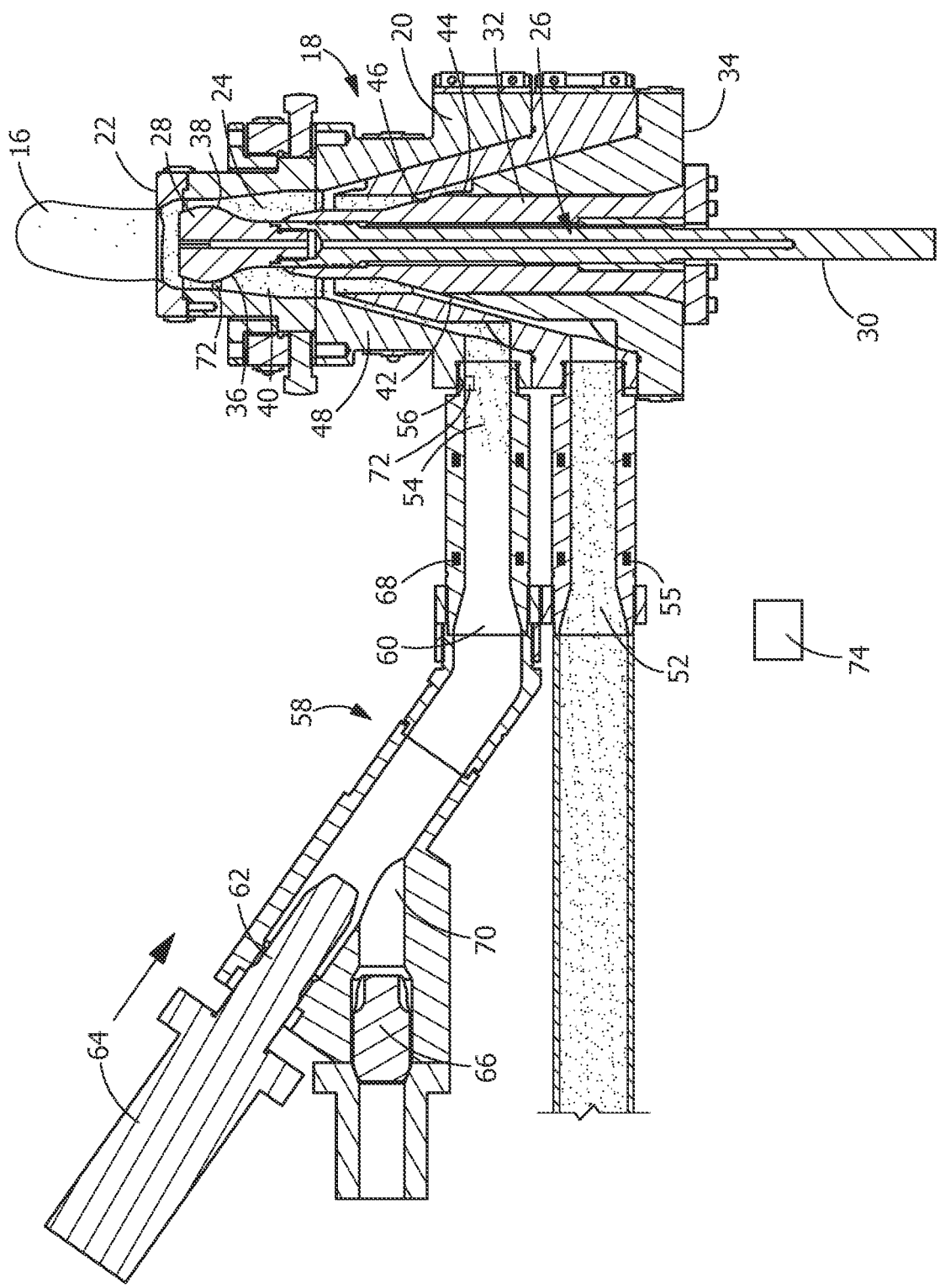
FIG. 6 is a cross-sectional view similar to that of FIG. 3 with the die pin in the open position, allowing the hollow parison to be released from the die, the plunger in the shot chamber mechanism is moved more fully back into the shot chamber to cause the molten thermoplastic material to flow from the shot chamber mechanism into the die.

Upon restart of production, the movable die pin mechanism 26 is moved to the open position, as shown in FIG. 6, and the screw extruders are started, allowing molten thermoplastic material 54 in the main melt pipe 52 to again flow. However, there is a period of time or lag between when the screw extruders are started and when the molten thermoplastic material 54 in the main melt pipe 52 reaches the parison forming head 28 of the movable die mechanism 26.

As the restart, and during the lag, the controller activates the piston 64 to move the plunger 62 back toward the flow head or die 18, in the direction of arrow B, as shown in FIG. 6. As this occurs, the molten thermoplastic material 54 in the shot chamber 60 is moved from the shot chamber 60 to the material forming portion 40 of the material flow cavity 24 of the flow head 18. With the movable die pin mechanism 26 in the open position, the molten thermoplastic material 54 from the shot chamber 60 if moved past the parison forming head 28 to form the desired tubular parison. The parison 16 is then moved into the molds 14 to be blow molded.

The speed at which the plunger 62 is moved allows the thermoplastic material 54 in the shot chamber 60 to be moved back into the material flow cavity 24 without degradation of the thermoplastic material 54. The controlled speed of the plunger 62 is also prevents air voids from forming in the thermoplastic material 54 which is moved from the shot chamber 60.

As the temperature of the thermoplastic material 54 in the shot chamber 60 is less than the molten thermoplastic material 54 in the main melt pipe 52, the thermoplastic material 54 coming from the shot chamber 60 has a higher viscosity than the thermoplastic material 54 coming from the main melt pipe 52. The higher viscosity of the thermoplastic material 54 coming from the shot chamber 60 allows the thermoplastic material 54 coming from the shot chamber 60 to be stiffer. The increased stiffness of the thermoplastic material 54 coming from the shot chamber 60 is beneficial at restart, particularly in an upward extruding blow molding apparatus, as the parison 16 can better keep its form until it reaches the molds 14.

With the flow properly established, and the thermoplastic material 54 coming from the shot chamber 60 is depleted, the thermoplastic material 54 coming from the main melt pipe 52 is used. The viscosity of the thermoplastic material 54 coming from the main melt pipe 52 allows the parison 16 to continually flow as the molds 14 ae rotated about the wheel 12 of the blow molding apparatus 10.

By incorporating the shot chamber mechanism 58 in the flow head or die 18, the blow molding apparatus 10 can be stopped without degradation of the thermoplastic material 54 or the need to purge the flow head or die 18 of degraded thermoplastic material 54. This provides for a safer and more cost effective system to deliver molten thermoplastic material 54 to the molds 14 of a blow molding apparatus 10.

In alternative uses, the molten thermoplastic material 54 in the shot chamber 62 is discarded or purged from the shot chamber 60, rather than maintained in the shot chamber 60. Upon restart of production, the movable die pin mechanism 26 is moved to the open position, as shown in FIG. 6, and the screw extruders are started, allowing molten thermoplastic material 54 in the main melt pipe 52 to again flow. At the restart or prior to the restart, additional or different material is fed into the shot chamber 60 through the branch 70. The material is heated by the heating elements 68 of the shot chamber 60 to a temperature desired to provide the material with the appropriate flow characteristics.

As the restart, the controller activates the piston 64 to move the plunger 62 back toward the flow head or die 18, in the direction of arrow B, as shown in FIG. 6. As this occurs, the additional or different material in the shot chamber 60 is moved from the shot chamber 60 to the material forming portion 40 of the material flow cavity 24 of the flow head 18. With the movable die pin mechanism 26 in the open position, the additional or different material from the shot chamber 60 if moved past the parison forming head 28 to form a portion of the desired tubular parison. The parison 16 is then moved into the molds 14 to be blow molded.

The speed at which the plunger 62 is moved allows the additional or different material in the shot chamber 60 to be moved back into the material flow cavity 24 without degradation of the thermoplastic material 54. The controlled speed of the plunger 62 is also prevents air voids from forming in the additional or different material which is moved from the shot chamber 60.

The temperature of the additional or different material in the shot chamber is maintained at a temperature which allows the additional or different material to have the desired viscosity and flow characteristics needed to be compatible with the molten thermoplastic material 54 in the main melt pipe 52. For example, if the additional or different material has a higher viscosity than the thermoplastic material 54 coming from the main melt pipe 52, the additional or different material. coming from the shot chamber 60 may be stiffer than the molten thermoplastic material 54 in the main melt pipe 52. The increased stiffness of the additional or different material coming from the shot chamber 60 is beneficial at restart, particularly in an upward extruding blow molding apparatus, as the parison 16 can better keep its form until it reaches the molds 14.

By incorporating the shot chamber mechanism 58 in the flow head or die 18, the blow molding apparatus 10 can be stopped without degradation of the thermoplastic material 54 or the need to purge the flow head or die 18 of degraded thermoplastic material 54. This provides for a safer and more cost effective system to deliver molten thermoplastic material 54 to the molds 14 of a blow molding apparatus 10. Alternatively, the use of the shot chamber mechanism 58 allows for additional or different material to be easily introduced into the flow head or die 18

While the invention has been described with reference to a preferred embodiment, it will be understood by those skilled in the art that various changes may be made and equivalents may be substituted for elements thereof without departing from the spirit and scope of the invention as defined in the accompanying claims. One skilled in the art will appreciate that the invention may be used with many modifications of structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. A flow head for use with a blow molding apparatus, the flow head comprising:
   a flow head housing having a material flow cavity, the flow head housing having a movable die pin mechanism which is moveable between an open position and a closed position;
   a main melt pipe connected to the material flow cavity, the main melt pipe being maintained at a first temperature;
   a shot chamber mechanism connected to the material flow cavity, the shot chamber being maintained at a second temperature;
   thermoplastic material which is formed into a parison for the blow molding apparatus;
   wherein, as the movable die pin mechanism is positioned in the closed position, the thermoplastic material is moved to the shot chamber to prevent degradation of the thermoplastic material.

2. The flow head as recited in claim 1, wherein the material flow cavity has a material forming portion and a material receiving portion, the material forming portion is provided proximate a parison extruding surface of the housing and is dimensioned to receive a parison forming head of the movable die pin mechanism, the material receiving portion is provided between the material forming portion and a bottom surface of the housing, the material receiving portion extends circumferentially about a center column of the housing.

3. The flow head as recited in claim 2, wherein a main melt pipe receiving opening extends through a side wall of the housing and into the material receiving portion, first heating elements are provided proximate to or in the main melt pipe to maintain the temperature of the thermoplastic material as it flows through the main melt pipe.

4. The flow head as recited in claim 3, wherein a shot chamber mechanism receiving opening extends through the side wall of the housing and into the material receiving portion.

5. The flow head as recited in claim 4, wherein the shot chamber mechanism receiving opening is positioned between the main melt pipe receiving opening and the parison extruding surface.

6. The flow head as recited in claim 1, wherein the shot chamber mechanism includes a shot chamber and a plunger.

7. The flow head as recited in claim 6, wherein the plunger is provided an end of the shot chamber mechanism which is spaced from the housing of the flow head, the plunger is movable between a closed position and an open position, wherein the movement of the plunger controls an amount and speed of flow of the thermoplastic material into and out of the shot chamber.

8. The flow head as recited in claim 7, wherein a controller controls the movement of the plunger between the open position and the closed position.

9. The flow head as recited in claim 6, wherein heating elements are provided proximate to or in the shot chamber to maintain the temperature of the molten thermoplastic material as it is stored and moved through the shot chamber.

10. The flow head as recited in claim 6, wherein one or more pressure sensors are provided in the shot chamber, in the material flow cavity, or in both the shot chamber and the material flow cavity.

11. The flow head as recited in claim 1, wherein the second temperature is lower than the first temperature.

12. A method for controlling the flow of molten thermoplastic material to a blow molding machine, the method comprising:
   feeding a molten thermoplastic material through a main melt pipe into a flow head operably connected to a chamber;
   stopping the feeding of the molten thermoplastic material through a main melt pipe into the flow head for a period of time, resulting in a volume of the molten thermoplastic material remaining in the flow head; and
   moving the volume of the molten thermoplastic material from the flow head into the chamber, wherein the volume of the molten thermoplastic material in the chamber is maintained at a temperature which is approximately equal to, but less than the temperature of the molten thermoplastic material in the main melt pipe.

13. The method as recited in claim 12, comprising:
feeding the volume of the molten thermoplastic material in the chamber into the flow head upon restarting of the flow of the molten thermoplastic material to the blow molding machine.

14. The method as recited in claim 12, wherein the feeding of the molten thermoplastic material in the chamber into the flow head upon restarting occurs before the feeding of the molten thermoplastic material through a main melt pipe.

15. The method as recited in claim 12, wherein the volume of the molten thermoplastic material in the chamber has a higher viscosity than the molten thermoplastic material in the main melt pipe.

16. The method as recited in claim 15, wherein when the volume of the molten thermoplastic material in the chamber is depleted, the molten thermoplastic material from the main melt pipe flows through the flow head.

17. The method as recited in claim 12, wherein the thermoplastic material is selected from the group consisting of high density polyethylene, low density polyethylene, polypropylene, polyvinyl chloride, polyethylene terephthalate, polystyrene, cyclic olefins, and extrusion polyethylene terephthalate.

18. The method as recited in claim 12, wherein a controller controls the movement of the volume of the molten thermoplastic material from the flow head into the chamber and from the chamber into the flow head.

19. The method as recited in claim 12, wherein the flow head is an upward extruding flow head used in a rotary blow molding machine.

20. A method for controlling the flow of molten thermoplastic material to a blow molding machine, the method comprising:
feeding a first molten thermoplastic material through a main melt pipe into a flow head operably connected to a chamber;
stopping the feed of the first molten thermoplastic material through a main melt pipe into the flow head for a period of time, resulting in a volume of the first molten thermoplastic material remaining in the flow head;
moving the volume of the first molten thermoplastic material from the flow head into the chamber;
discarding the volume of the first molten thermoplastic material from the chamber;
moving a second molten thermoplastic material into the chamber and heating the second molten thermoplastic material;
restarting the feed of the first molten thermoplastic material and moving the second molten thermoplastic material from the chamber to the flow head.

* * * * *